(12) United States Patent
Zhang et al.

(10) Patent No.: US 9,531,631 B2
(45) Date of Patent: Dec. 27, 2016

(54) MULTILINK-BASED DATA TRANSMISSION METHOD AND DEVICE

(71) Applicant: Huawei Device Co., Ltd., Shenzhen (CN)

(72) Inventors: Kai Zhang, Xi'an (CN); Haijun Wu, Shenzhen (CN); Shuhua Chen, Bonn (DE)

(73) Assignee: Huawei Device Co., Ltd., Shenzhen (CN)

( * ) Notice: Subject to any disclaimer, the term of this patent is extended or adjusted under 35 U.S.C. 154(b) by 87 days.

(21) Appl. No.: 14/586,287

(22) Filed: Dec. 30, 2014

(65) Prior Publication Data
US 2015/0117212 A1     Apr. 30, 2015

Related U.S. Application Data

(63) Continuation of application No. PCT/CN2014/072125, filed on Feb. 17, 2014.

(30) Foreign Application Priority Data

Feb. 28, 2013   (CN) .......................... 2013 1 0066030

(51) Int. Cl.
   *G01R 31/08*     (2006.01)
   *H04L 12/803*    (2013.01)
   (Continued)

(52) U.S. Cl.
   CPC ......... *H04L 47/125* (2013.01); *H04L 12/4633* (2013.01); *H04W 76/022* (2013.01); *H04L 2212/00* (2013.01)

(58) Field of Classification Search
   USPC .............. 370/216, 236, 219, 252, 331, 392, 338,370/409, 428, 474; 709/220, 223, 235, 203, 709/221, 224, 219, 228
   See application file for complete search history.

(56) References Cited

U.S. PATENT DOCUMENTS 7,489,700 B2 *  2/2009  Ooguchi ............. H04L 12/2856
                                                     370/409
8,260,922 B1 *  9/2012  Aggarwal ............... H04L 45/24
                                                     709/226
(Continued)

FOREIGN PATENT DOCUMENTS

CN       102420745 A       4/2012
CN       102450053 A       5/2012
(Continued)

OTHER PUBLICATIONS

Foreign Communication From a Counterpart Application, European Application No. 14757067.5, Extended European Search Report dated Jun. 30, 2015, 10 pages.
(Continued)

*Primary Examiner* — Phuongchau Ba Nguyen
(74) *Attorney, Agent, or Firm* — Conley Rose, P.C.

(57) ABSTRACT

A multilink-based data transmission method includes establishing separately, by a first device, first tunnels in different types of links in which the first device and a second device have established a communication connection, establishing, by the first device, a second tunnel that crosses the first tunnels established in the multiple different types of links, analyzing, by the first device, a load state of each first tunnel crossed by the second tunnel, and selecting a first tunnel used to transmit a target packet, and encapsulating, by the first device, the target packet into the second tunnel, and sending, to the second device, through the first tunnel used to transmit the target packet, the packet encapsulated into the second tunnel. Correspondingly, a data transmission device
(Continued)

is provided. A utilization rate of links supported by a network device can be improved with the method and device.

20 Claims, 4 Drawing Sheets

(51) Int. Cl.
  *H04W 76/02* (2009.01)
  *H04L 12/46* (2006.01)

(56) References Cited

U.S. PATENT DOCUMENTS

| | | | | |
|---|---|---|---|---|
| 2007/0121615 | A1* | 5/2007 | Weill | H04L 12/4633 |
| | | | | 370/389 |
| 2007/0180104 | A1* | 8/2007 | Filsfils | H04L 45/02 |
| | | | | 709/224 |
| 2009/0122990 | A1* | 5/2009 | Gundavelli | H04L 12/4641 |
| | | | | 380/278 |
| 2011/0090794 | A1 | 4/2011 | Cherian et al. | |
| 2011/0149971 | A1* | 6/2011 | Zhu | H04L 47/10 |
| | | | | 370/392 |
| 2012/0147890 | A1* | 6/2012 | Kikuchi | H04L 12/4633 |
| | | | | 370/392 |
| 2012/0303835 | A1* | 11/2012 | Kempf | H04W 24/02 |
| | | | | 709/235 |
| 2013/0054761 | A1* | 2/2013 | Kempf | H04L 47/781 |
| | | | | 709/220 |
| 2013/0322258 | A1* | 12/2013 | Nedeltchev | H04L 43/04 |
| | | | | 370/241 |

FOREIGN PATENT DOCUMENTS

| | | |
|---|---|---|
| WO | 2008004713 A1 | 1/2008 |
| WO | WO 2010/121191 A1 * 10/2010 | ............ H04W 80/04 |

OTHER PUBLICATIONS

Partial English Translation and Abstract of Chinese Patent Application No. CN102420745A, Part 1, Feb. 5, 2015, 4 pages.
Partial English Translation and Abstract of Chinese Patent Application No. CN102420745A, Part 2, Feb. 5, 2015, 2 pages.
Foreign Communication From a Counterpart Application, PCT Application No. PCT/CN2014/072125, English Translation of International Search Report dated Jul. 8, 2014, 2 pages.
Foreign Communication From a Counterpart Application, PCT Application No. PCT/CN2014/072125, Written Opinion dated Jul. 8, 2014, 5 pages.

* cited by examiner

MULTILINK-BASED DATA TRANSMISSION METHOD AND DEVICE

CROSS-REFERENCE TO RELATED APPLICATION

This application is a continuation of International Application No. PCT/CN2014/072125, filed on Feb. 17, 2014, which claims priority to Chinese Patent Application No. 201310066030.8, filed on Feb. 28, 2013, both of which are hereby incorporated by reference in their entireties.

TECHNICAL FIELD

The present invention relates to the communications field, and in particular, to a multilink-based data transmission method and device.

BACKGROUND

Currently, a network device that supports multiple links is more widely applied, for example, a network device that supports both a digital subscriber line (DSL) network link and a Long Term Evolution (LTE) network link. The most extensive implementation manner applied by the current network device that supports multiple links is to fixedly bear different services on different links. For example, a network television service and an Internet service are borne on the DSL network link, and a voice service is borne on the LTE network link.

However, in the foregoing technical solutions, because the links supported by the network device fixedly bear some services and services used by a user are not fixed, for example, the network television service is more frequently used while the voice service is less used by the user in a time segment A. As a result, a load of a link used to bear the network television service is extremely heavy, and a load of a link used to bear the voice service is extremely light. Therefore, a utilization rate of the links supported by the network device is extremely low.

SUMMARY

Embodiments of the present invention provide a multilink-based data transmission method and device, which can improve a utilization rate of links supported by a network device.

According to a first aspect, an embodiment of the present invention provides a multilink-based data transmission method, and the method includes establishing separately, by a first device, first tunnels in different types of links in which the first device and a second device have established a communication connection, establishing, by the first device, a second tunnel that crosses the first tunnels established in the different types of links, analyzing, by the first device, a load state of each first tunnel crossed by the second tunnel, and selecting a first tunnel used to transmit a target packet, and encapsulating, by the first device, the target packet into the second tunnel, and sending, to the second device, through the first tunnel used to transmit the target packet, the packet encapsulated into the second tunnel.

In a first possible implementation manner, the sending, to the second device, through the first tunnel used to transmit the target packet, the packet encapsulated into the second tunnel includes encapsulating, by the first device, into the first tunnel used to transmit the target packet, the packet encapsulated into the second tunnel, and sending, to the second device through the first tunnel, the target packet that is encapsulated into the first tunnel used to transmit the target packet.

With reference to the first possible implementation manner of the first aspect, in a second possible implementation manner, the first tunnel is a tunnel that crosses a virtual link, and the sending, to the second device through the first tunnel, the target packet that is encapsulated into the first tunnel used to transmit the target packet includes encapsulating, by the first device, into the virtual link crossed by the first tunnel, the target packet that is encapsulated into the first tunnel used to transmit the target packet, and sending a packet encapsulated into the virtual link to the second device.

With reference to any one of the foregoing implementation manners, in a third possible implementation manner, a connection between the first device and the second device includes links established by the first device with the second device by using different interfaces, or links established by the first device with different interfaces on the second device by using a same interface.

According to a second aspect, an embodiment of the present invention provides a data transmission device, and the device includes a first establishing unit, a second establishing unit, an analyzing unit, and a sending unit, where the first establishing unit is configured to separately establish first tunnels in different types of links in which the data transmission device and the second device have established a communication connection, the second establishing unit is configured to establish a second tunnel that crosses the first tunnels established in the different types of links, the analyzing unit is configured to analyze a load state of each first tunnel crossed by the second tunnel, and select a first tunnel used to transmit a target packet, and the sending unit is configured to encapsulate the target packet into the second tunnel, and send, to the second device, through the first tunnel used to transmit the target packet, the packet encapsulated into the second tunnel.

In a first possible implementation manner, the sending unit is further configured to encapsulate, into the first tunnel used to transmit the target packet, the packet encapsulated into the second tunnel, and send, to the second device through the first tunnel, the target packet that is encapsulated into the first tunnel used to transmit the target packet.

With reference to the first possible implementation manner of the second aspect, in a second possible implementation manner, the first tunnel is a tunnel that crosses a virtual link, and the sending unit encapsulates, into the virtual link crossed by the first tunnel, the target packet that is encapsulated into the first tunnel used to transmit the target packet, and sends a packet encapsulated into the virtual link to the second device.

With reference to any one of the foregoing implementation manners, in a third possible implementation manner, a connection between the data transmission device and the second device includes links established by the data transmission device with the second device by using different interfaces, or links established by the data transmission device with different interfaces on the second device by using a same interface.

According to a third aspect, an embodiment of the present invention further provides a multilink-based data transmission system, and the system includes a first device and a second device, where the first device is configured to separately establish first tunnels in different types of links in which the first device and the second device have established a communication connection, and establish a second tunnel that crosses the first tunnels established in the different types of links, analyze a load state of each first tunnel crossed by the second tunnel, and select a first tunnel used to transmit a target packet, and encapsulate the target packet into the second tunnel, and send, to the second device, through the first tunnel used to transmit the target packet, a packet encapsulated into the second tunnel, and the second device is configured to receive, through the first tunnel used to transmit the target packet, the packet sent by the first device, and decapsulate the packet, so as to obtain the target packet.

In a first possible implementation manner, the first device is further configured to encapsulate, into the first tunnel used to transmit the target packet, the packet encapsulated into the second tunnel, and send, to the second device through the first tunnel, the target packet that is encapsulated into the first tunnel used to transmit the target packet.

In the foregoing technical solutions, a first device separately establishes first tunnels in multiple different types of links in which the first device and a second device have established a communication connection, the first device establishes a second tunnel that crosses the first tunnels established in the multiple different types of links, the first device analyzes a load state of each first tunnel crossed by the second tunnel, and selects a first tunnel used to transmit a target packet, and the first device encapsulates the target packet into the second tunnel, and sends, to the second device, through the first tunnel used to transmit the target packet, a packet encapsulated into the second tunnel. That is, the first tunnel for transmitting the packet is selected according to a load state of the first tunnels. Therefore, a transmission path is properly allocated. In this way, a utilization rate of links supported by a network device can be improved.

BRIEF DESCRIPTION OF DRAWINGS

To describe the technical solutions in the embodiments of the present invention more clearly, the following briefly introduces the accompanying drawings required for describing the embodiments. The accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. The described embodiments are merely a part rather than all of the embodiments of the present invention. All other embodiments obtained by a person of ordinary skill in the art based on the embodiments of the present invention without creative efforts shall fall within the protection scope of the present invention.

Figure 1:
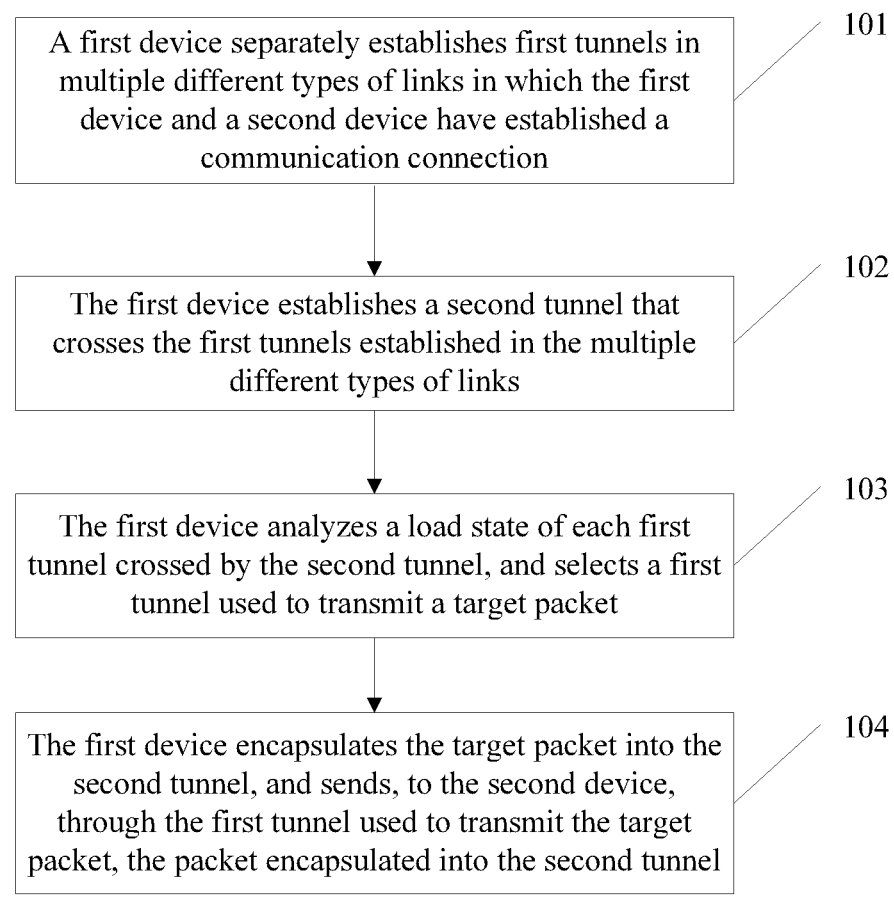
FIG. 1 is a schematic flowchart of a multilink-based data transmission method according to an embodiment of the present invention.

FIG. 1 is a schematic flowchart of a multilink-based data transmission method according to an embodiment of the present invention, and as shown in FIG. 1, the method includes the following steps.

101. A first device separately establishes first tunnels in multiple different types of links in which the first device and a second device have established a communication connection.

102. The first device establishes a second tunnel that crosses the first tunnels established in the multiple different types of links.

103. The first device analyzes a load state of each first tunnel crossed by the second tunnel, and selects a first tunnel used to transmit a target packet.

104. The first device encapsulates the target packet into the second tunnel, and sends, to the second device, through the first tunnel used to transmit the target packet, a packet encapsulated into the second tunnel.

As an optional implementation manner, the first device may be a home gateway device and the second device may be a server, such as an aggregation server. The packet in this implementation manner may be an uplink packet sent by a device connected to the home gateway device.

As an optional implementation manner, the first device may be a server device, such as an aggregation server, and the second device may be a home gateway device. The packet in this implementation manner may be a downlink packet sent by a network side.

In the foregoing technical solution, a first device separately establishes first tunnels in multiple different types of links in which the first device and the second device have established a communication connection. The first device establishes a second tunnel that crosses the first tunnels established in the multiple different types of links. The first device analyzes a load state of each first tunnel crossed by the second tunnel and selects a first tunnel used to transmit a target packet. The first device encapsulates the target packet into the second tunnel and sends, to the second device through the first tunnel used to transmit the target packet, a packet encapsulated into the second tunnel. That is, the first tunnel for transmitting the packet is selected according to a load state of the first tunnels. Therefore, a transmission path is properly allocated. In this way, a utilization rate of links supported by a network device can be improved.

Figure 2:
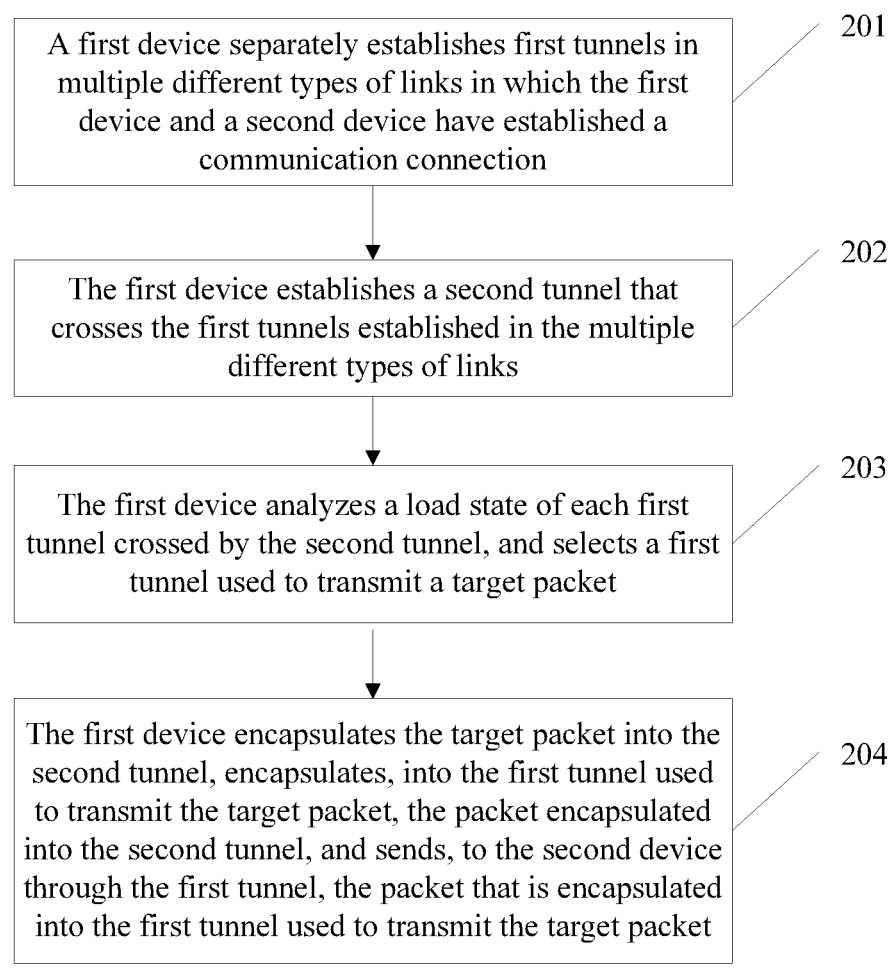
FIG. 2 is a schematic flowchart of another multilink-based data transmission method according to an embodiment of the present invention.

FIG. 2 is a schematic flowchart of another multilink-based data transmission method according to an embodiment of the present invention, and as shown in FIG. 2, the method includes the following steps.

201. A first device separately establishes first tunnels in multiple different types of links in which the first device and a second device have established a communication connection.

Optionally, the links that connect the first device and the second device may include a DSL link and an LTE link. Certainly, the DSL link and the LTE link are only examples in this embodiment of the present invention, and in this embodiment of the present invention, the number of links, a layer of a link, a form of a link, and a path of a link are not limited.

Optionally, the first tunnel may be Generic Routing Encapsulation (GRE) tunnels. Certainly, the first tunnels may also be other point to point tunnels, such as virtual private network (VPN) tunnels.

202. The first device establishes a second tunnel that crosses the first tunnels established in the multiple different types of links.

Optionally, the crossing indicates that the second tunnel is borne on the first tunnels established in the multiple different types of links, and that a packet at a source point of the second tunnel may be transmitted to an end point of the second tunnel through any first tunnel crossed by the second tunnel.

Optionally, for establishing first tunnels in the links, whether other tunnels can further be established after one first tunnel is established in one link is not limited in this embodiment of the present invention.

Optionally, the second tunnel may be a virtual tunnel that crosses the first tunnels established in the multiple different types of links, such as a Layer 2 Tunneling Protocol (L2TP) VPN tunnel. The encapsulating the target packet into the second tunnel may refer to performing L2TP encapsulation on the target packet.

203. The first device analyzes a load state of each first tunnel crossed by the second tunnel, and selects a first tunnel used to transmit a target packet.

Optionally, the analyzing may be analyzing the load state borne by each link, or may be analyzing a load state about efficiency and the like of a transmission load of each link, or analyzing a network parameter and a device status that relate to packet transmission.

204. The first device encapsulates the target packet into the second tunnel, encapsulates, into the first tunnel used to transmit the target packet, the packet encapsulated into the second tunnel, and sends, to the second device through the first tunnel, the target packet that is encapsulated into the first tunnel used to transmit the target packet.

Optionally, when the first tunnel is a GRE tunnel, the encapsulating, into the first tunnel used to transmit the target packet, the packet encapsulated into the second tunnel refers to performing GRE encapsulation on the packet encapsulated into the second tunnel.

As an optional implementation manner, before step 201, the method may further include translating, by the first device, the target packet into a target packet with a public internet protocol (IP) address.

Optionally, the translating the target packet into a target packet of a public IP address is translating an IP address of the target packet into the public IP address, such as performing network address translation (NAT) on the target packet.

The public IP address may be a public IP address acquired from a Dynamic Host Configuration Protocol (DHCP) server, or may be a public IP address acquired from a Point-to-Point Protocol over Ethernet (PPPoE) server. In this implementation manner, the first device may be a home gateway device, and the second device may be a server, that is, the target packet is an uplink packet.

As an optional implementation manner, the first tunnel is a tunnel that crosses a virtual link, and the sending, to the second device through the first tunnel, the target packet that is encapsulated into the first tunnel used to transmit the target packet in step 204 may include encapsulating, by the first device, into the virtual link crossed by the first tunnel, the target packet that is encapsulated into the first tunnel used to transmit the target packet, and sending a packet encapsulated into the virtual link to the second device.

In this way, three-layer encapsulation on the target packet may be implemented, and the virtual link may include a Point-to-Point Protocol (PPP) link or a PPPoE link.

Optionally, the links that connect the first device and the second device include multiple links established by the first device with the second device by using different interfaces. That is, each link established by the first device and the second device is over an independent interface on the first device. For example, the links that connect the first device and the second device include a DSL link and an LTE link. Therefore, the first device includes a DSL interface which is configured to establish a DSL link with the second device, and the first device further includes the LTE interface which is configured to establish an LTE link with the second device. Each link established by the first device and the second device may be over a same interface on the second device. That is, one interface on the second device separately establishes multiple links with multiple interfaces on the first device. For example, when the links are a DSL link and an LTE link, the establishing first tunnels in links that connect the first device and the second device in step 201 may be that the DSL interface and the LTE interface on the first device separately establish the first tunnels with the second device. The first device may be a home gateway device, and the second device may be a server, that is, the target packet is an uplink packet.

Optionally, the links that connect the first device and the second device include multiple links established by the first device with different interfaces on the second device by using a same interface. That is, each link established by the first device and the second device is over a same interface on the first device. For example, the links that connect the first device and the second device include a DSL link and an LTE link. Therefore, the first device may have only one interface which is configured to establish a DSL link and an LTE link with the second device. Each link established by the first device and the second device may be over an independent interface on the second device. That is, multiple interfaces on the second device separately establish multiple links with one interface on the first device. For example, when the links are a DSL link and an LTE link, step 201 may be that an interface on the first device establishes first tunnels with a DSL interface and an LTE interface on the second device. The first device may be a server, and the second device may be a home gateway device, that is, the target packet is a downlink packet.

As an optional implementation manner, after the first device sends the target packet encapsulated into the first tunnel to the second device, the second device performs decapsulation, corresponding to the first tunnel, on an acquired encapsulation packet to acquire an encapsulation packet that includes the target packet and is corresponding to the second tunnel. Then the second device performs packet reassembly on the encapsulation packet and performs decapsulation, corresponding to the second tunnel, on the reassembled packet so as to extract the target packet. The decapsulation corresponding to the first tunnel is in one-to-one correspondence with encapsulation in step 204 in a one-to-one manner. For example, when the first tunnel is a GRE tunnel, the decapsulation is GRE decapsulation. The removing encapsulation, corresponding to the second tunnel, of the reassembled encapsulation packet is in one-to-one correspondence with the encapsulation in step 204. For example, when the second tunnel is an L2TP tunnel, the removing is removing L2TP encapsulation.

When the second device is a server, the second device may send the acquired target packet to a destination address corresponding to the target packet.

When the second device is a home gateway device and after the second device extracts the target packet, the second device may further perform NAT on the target packet, that is, translate a public IP address of the target packet into an IP address of a device connected to the second device and send the translated target packet to the device connected to the second device.

Based on the foregoing embodiment, the foregoing technical solutions introduce multiple optional implementation manners of improving a utilization rate of links supported by a network device.

The following is apparatus embodiments of the present invention, and the apparatus embodiments of the present invention are used to execute the methods implemented in method Embodiment 1 and Embodiment 2 of the present invention. For ease of description, only a part related to this embodiment of the present invention is shown. For specific technical details that are not disclosed, refer to Embodiment 1 and Embodiment 2 of the present invention.

Figure 3:
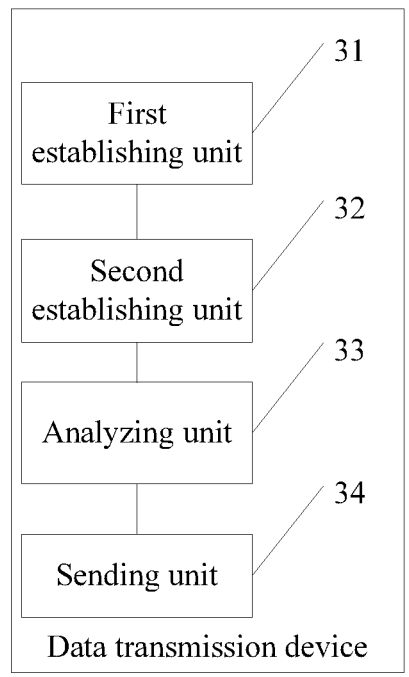
FIG. 3 is a schematic structural diagram of a data transmission device according to an embodiment of the present invention.

FIG. 3 is a schematic structural diagram of a data transmission device according to an embodiment of the present invention. As shown in FIG. 3, the device includes a first establishing unit 31, a second establishing unit 32, an analyzing unit 33, and a sending unit 34. The first establishing unit 31 is configured to separately establish first tunnels in multiple different types of links in which the data transmission device and a second device have established a communication connection. The second establishing unit 32 is configured to establish a second tunnel that crosses the first tunnels established in the multiple different types of links. The analyzing unit 33 is configured to analyze a load state of each first tunnel crossed by the second tunnel and select a first tunnel used to transmit a target packet. The sending unit 34 is configured to encapsulate the target packet into the second tunnel and send, to the second device through the first tunnel used to transmit the target packet, a packet encapsulated into the second tunnel.

As an optional implementation manner, the data transmission device may be a home gateway device, and the second device may be a server, such as an aggregation server. The target packet in this implementation manner may be an uplink packet sent by a device connected to the home gateway device.

As an optional implementation manner, the data transmission device may be a server device, such as an aggregation server, and the second device may be a home gateway device. The target packet in this implementation manner may be a downlink packet sent by a network side.

In the foregoing technical solutions, a data transmission device establishes a first tunnel in each link in which the data transmission device and a second device have established a communication connection. The data transmission device establishes, with the second device, a second tunnel that crosses the first tunnel established in each link. The data transmission device analyzes a load state of each first tunnel crossed by the second tunnel and selects a first tunnel used to transmit a target packet. The data transmission device encapsulates the target packet into the second tunnel and sends, to the second device, through the first tunnel used to transmit the target packet, a packet encapsulated into the second tunnel. That is, the first tunnel for transmitting the packet is selected according to a load state of the first tunnels. Therefore, a transmission path is properly allocated. In this way, a utilization rate of links supported by a network device can be improved.

Figure 4:
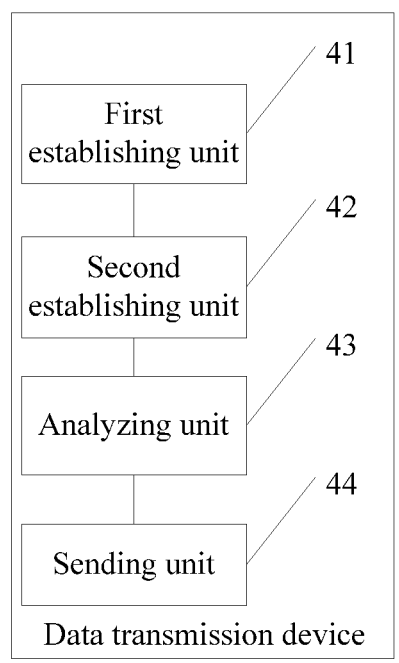
FIG. 4 is a schematic structural diagram of another data transmission device according to an embodiment of the present invention.

FIG. 4 is a schematic structural diagram of a data transmission device according to an embodiment of the present invention. As shown in FIG. 4, the device includes a first establishing unit 41, a second establishing unit 42, an analyzing unit 43, and a sending unit 44. The first establishing unit 41 is configured to separately establish first tunnels in multiple different types of links in which the data transmission device and a second device have established a communication connection. The second establishing unit 42 is configured to establish a second tunnel that crosses the first tunnels established in the multiple different types of links. The analyzing unit 43 is configured to analyze a load state of each first tunnel crossed by the second tunnel and select a first tunnel used to transmit a target packet. The sending unit 44 is configured to encapsulate the target packet into the second tunnel, encapsulate, into the first tunnel used to transmit the target packet, the packet encapsulated into the second tunnel, and send, to the second device through the first tunnel, the target packet that is encapsulated into the first tunnel used to transmit the target packet.

Optionally, the links that connect the data transmission device and the second device may include a DSL link and an LTE link. Certainly, the DSL link and the LTE link are only examples in this embodiment of the present invention, and the number of links, a layer of a link, a form of a link, and a path of a link are not limited in this embodiment of the present invention.

Optionally, the first tunnels may be GRE tunnels. Certainly, the first tunnels may also be other tunnels, such as VPN tunnels.

Optionally, the second tunnel may be a virtual tunnel that crosses each link connecting the data transmission device and the second device, such as a L2TP VPN tunnel. The encapsulating the target packet into the second tunnel may refer to performing L2TP encapsulation on the target packet.

Optionally, the analyzing may be analyzing the load state borne by each link, or may be analyzing a load state about efficiency and the like of a transmission load of each link, or analyzing a network parameter and a device status that relate to packet transmission.

As an optional implementation manner, the data transmission device may further include a translating unit (not shown in the figure) configured to translate the target packet into a target packet of a public IP address.

Optionally, the translating the target packet into a target packet of a public IP address is translating an IP address of the target packet into the public IP address, such as performing NAT on the target packet.

The public IP address may be a public IP address acquired from a DHCP server, or may be a public IP address acquired from a PPP server. In this implementation manner, the data transmission device may be a home gateway device, and the second device may be a server, that is, the target packet is an uplink packet.

As an optional implementation manner, the first tunnel is a tunnel that crosses a virtual link, and the sending unit 44 may further be configured to encapsulate, into the virtual link crossed by the first tunnel, the target packet that is encapsulated into the first tunnel used to transmit the target packet, and send a packet encapsulated into the virtual link to the second device.

In this way, three-layer encapsulation for the target packet may be implemented, and the virtual link may include a PPP link or a PPPoE link.

Optionally, the links that connect the data transmission device and the second device include multiple links established by the data transmission device with the second device by using different interfaces. That is, each link established by the data transmission device and the second device is over an independent interface on the data transmission device. For example, the links that connect the data transmission device and the second device include a DSL link and an LTE link. Therefore, the data transmission device includes a DSL interface which is configured to establish a DSL link with the second device, and the data transmission device further includes the LTE link which is configured to establish an LTE link with the second device. Each link established by the data transmission device and the second device may be over a same interface on the second device. That is, one interface on the second device separately establishes multiple links with multiple interfaces on the data transmission device. In this implementation manner, the data transmission device may be a home gateway device, and the second device may be a server, that is, the target packet is an uplink packet.

Optionally, the links that connect the data transmission device and the second device include multiple links established by the data transmission device with different interfaces on the second device by using a same interface. That is, each link established by the data transmission device and the second device is over the same interface on the data transmission device. For example, the links that connect the data transmission device and the second device include a DSL link and an LTE link. Therefore, the data transmission device may have only one interface which is configured to establish a DSL link and an LTE link with the second device over the data transmission device and the second device may be an independent interface on the second device. That is, multiple interfaces on the second device separately establish multiple links with one interface on the data transmission device. In this implementation manner, the data transmission device may be a server, and the second device may be a home gateway device, that is, the target packet is a downlink packet.

As an optional implementation manner, after the data transmission device sends the target packet encapsulated into the first tunnel to the second device, the second device performs decapsulation, corresponding to the first tunnel, on an acquired encapsulation packet to acquire an encapsulation packet that includes the target packet and is corresponding to the second tunnel. Then the second device performs packet reassembly on the encapsulation packet and then removes encapsulation, corresponding to the second tunnel, of the reassembled encapsulation packet so as to extract the target packet.

When the second device is a server, the second device may send the acquired target packet to a destination address corresponding to the target packet.

When the second device is a home gateway device and after the second device extracts the target packet, the second device may further perform NAT on the target packet, that is, translate a public IP address of the target packet into an IP address of a device connected to the second device, and send the translated target packet to the device connected to the second device.

Based on the foregoing embodiment, the foregoing technical solutions introduce multiple optional implementation manners of improving a utilization rate of links supported by a network device.

Figure 5:
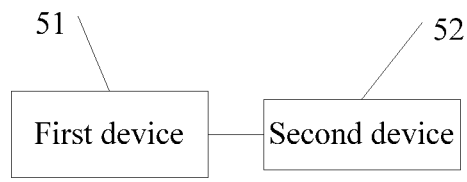
FIG. 5 is a schematic structural diagram of a multilink-based data transmission system according to an embodiment of the present invention.

FIG. 5 is a schematic structural diagram of a multilink-based data transmission system according to an embodiment of the present invention. As shown in FIG. 5, the system includes a first device 51 and a second device 52. The first device 51 is configured to separately establish first tunnels in multiple different types of links in which the first device 51 and the second device 52 have established a communication connection, and establish a second tunnel that crosses the first tunnels established in the multiple different types of links, analyze a load state of each first tunnel crossed by the second tunnel, and select a first tunnel used to transmit a target packet; and encapsulate the target packet into the second tunnel, and send, to the second device, through the first tunnel used to transmit the target packet, a packet encapsulated into the second tunnel 52. The second device 52 is configured to receive, through the first tunnel used to transmit the target packet, the packet sent by the first device, and decapsulate the packet so as to obtain the target packet.

As an optional implementation manner, the first device 51 may further be configured to encapsulate, into the first tunnel used to transmit the target packet, the packet encapsulated into the second tunnel, and send, to the second device through the first tunnel, the target packet that is encapsulated into the first tunnel used to transmit the target packet.

As an optional implementation manner, the first device may be a home gateway device, and the second device may be a server, such as an aggregation server. The packet in this implementation manner may be an uplink packet sent by a device connected to the home gateway device.

As an optional implementation manner, the first device may be a server device, such as an aggregation server, and the second device may be a home gateway device. The packet in this implementation manner may be a downlink packet sent by a network side.

In the foregoing technical solutions, a first device separately establishes first tunnels in multiple different types of links in which the first device and a second device have established a communication connection. The first device establishes a second tunnel that crosses the first tunnels established in the multiple different types of links. The first device analyzes a load state of each first tunnel crossed by the second tunnel and selects a first tunnel used to transmit a target packet. The first device encapsulates the target packet into the second tunnel and sends, to the second device, through the first tunnel used to transmit the target packet, a packet encapsulated into the second tunnel. That is, the first tunnel for transmitting the packet is selected according to a load state of the first tunnels. Therefore, a transmission path is properly allocated. In this way, a utilization rate of links supported by a network device can be improved.

Figure 6:
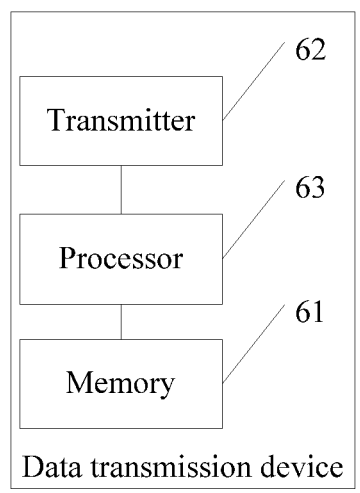
FIG. 6 is a schematic structural diagram of a data transmission device according to an embodiment of the present invention.

FIG. 6 is a schematic structural diagram of another data transmission device according to an embodiment of the present invention. As shown in FIG. 6, the device includes a memory 61, a transmitter 62, and a processor 63 that is connected to the memory 61 and the transmitter 62. The memory 61 stores a set of program code. The processor 63 is configured to invoke the program code stored in the memory to perform the operations of establishing separately first tunnels in multiple different types of links in which the data transmission device and a second device have established a communication connection, establishing a second tunnel that crosses the first tunnels established in the multiple different types of links, analyzing a load state of each first tunnel crossed by the second tunnel and selecting a first tunnel used to transmit a target packet, and encapsulating the target packet into the second tunnel, and sending, by using the transmitter 62 to the second device, through the first tunnel used to transmit the target packet, a packet encapsulated into the second tunnel.

As an optional implementation manner, the data transmission device may be a home gateway device, and the second device may be a server, such as an aggregation server. The packet in this implementation manner may be an uplink packet sent by a device connected to the home gateway device.

As an optional implementation manner, the data transmission device may be a server device, such as an aggregation server, and the second device may be a home gateway device. The packet in this implementation manner may be a downlink packet sent by a network side.

In the foregoing technical solutions, a data transmission device separately establishes first tunnels in multiple different types of links in which the data transmission device and a second device have established a communication connection. The data transmission device establishes a second tunnel that crosses the first tunnels established in the multiple different types of links. The data transmission device analyzes a load state of each first tunnel crossed by the second tunnel and selects a first tunnel used to transmit a target packet. The data transmission device encapsulates the target packet into the second tunnel and sends, to the second device, through the first tunnel used to transmit the target packet, a packet encapsulated into the second tunnel. That is, the first tunnel for transmitting the packet is selected according to a load state of the first tunnels. Therefore, a transmission path is properly allocated. In this way, a utilization rate of links supported by a network device can be improved.

Figure 7:
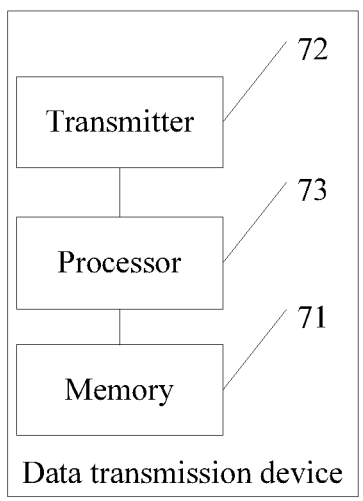
FIG. 7 is a schematic structural diagram of another data transmission device according to an embodiment of the present invention.

FIG. 7 is a schematic structural diagram of another data transmission device according to an embodiment of the present invention As shown in FIG. 7, the device includes a memory 71, a transmitter 72, and a processor 73 that is connected to the memory 71 and the transmitter 72. The memory 71 stores a set of program code. The processor 73 is configured to invoke a program stored in the memory to perform the operations of establishing separately first tunnels in multiple different types of links in which the data transmission device and a second device have established a communication connection, establishing a second tunnel that crosses the first tunnels established in the multiple different types of links, analyzing a load state of each first tunnel crossed by the second tunnel and selecting a first tunnel used to transmit a target packet, and encapsulating the target packet into the second tunnel, encapsulating, into the first tunnel used to transmit the target packet, the packet encapsulated into the second tunnel, and sending by using the transmitter 72, to the second device through the first tunnel, the target packet that is encapsulated into the first tunnel used to transmit the target packet.

Optionally, the links that connect the data transmission device and the second device may include a DSL link and an LTE link. Certainly, the DSL link and the LTE link are only examples in this embodiment of the present invention, and the number of links, a layer of a link, a form of a link, and a path of a link are not limited in this embodiment of the present invention.

Optionally, the first tunnels may be GRE tunnels. Certainly, the first tunnels may also be other point to point tunnels, such as VPN tunnels.

Optionally, the second tunnel may be a virtual tunnel that crosses each link connecting the data transmission device and the second device, such as an L2TP VPN tunnel. The encapsulating the target packet into the second tunnel may refer to performing L2TP encapsulation on the target packet.

Optionally, the analyzing may be analyzing the load state borne by each link, or may be analyzing a load state about efficiency and the like of a transmission load of each link, or analyzing a network parameter and a device status that relate to packet transmission.

As an optional implementation manner, before performing the operation of establishing first tunnels in each link connecting the data transmission device and the second device, the processor 73 may further be configured to execute the operation of translating the target packet into a target packet of a public IP address.

Optionally, the translating the target packet into a target packet of a public IP address is translating an IP address of the target packet into the public IP address, such as performing NAT on the target packet.

The public IP address may be a public IP address acquired from a DHCP server, or may be a public IP address acquired from a PPPoE server. In this implementation manner, the data transmission device may be a home gateway device, and the second device may be a server, that is, the target packet is an uplink packet.

As an optional implementation manner, the first tunnel is a tunnel that crosses a virtual link and the sending, which is performed by the processor 73 using the transmitter 72, to the second device through the first tunnel, the target packet that is encapsulated into the first tunnel used to transmit the target packet may include encapsulating, into the virtual link crossed by the first tunnel, the target packet that is encapsulated into the first tunnel used to transmit the target packet, and sending, by using the transmitter 72, a packet encapsulated into the virtual link to the second device.

In this way, three-layer encapsulation for the target packet may be implemented, and the virtual link may include PPP link or a PPPoE link.

Optionally, the links that connect the data transmission device and the second device include: multiple links established by the data transmission device with the second device by using different interfaces.

Optionally, the links that connect the data transmission device and the second device include: multiple links established by the data transmission device with different interfaces on the second device by using a same interface.

When the second device is a server, the second device may send the acquired target packet to a destination address corresponding to the target packet.

When the second device is a home gateway device and after the second device extracts the target packet, the second device may further perform NAT on the target packet, that is, translate a public IP address of the target packet into an IP address of a device connected to the second device and send the translated target packet to the device connected to the second device.

Based on the foregoing embodiment, the foregoing technical solutions introduce multiple optional implementation manners of improving a utilization rate of links supported by a data transmission device.

A person of ordinary skill in the art may understand that all or a part of the processes of the methods in the embodiments may be implemented by a computer program instructing relevant hardware. The program may be stored in a computer readable storage medium. When the program runs, the processes of the methods in the embodiments are performed. The foregoing storage medium may include a magnetic disk, an optical disc, a read-only memory (ROM), or a random access memory (RAM).

The disclosed are merely exemplary embodiments of the present invention, but are not intended to limit the scope of the present invention. Equivalent variation figured out according to the claims shall fall within the protection scope of the present invention.

What is claimed is:

1. A multilink-based data transmission method, comprising:
    separately establishing, by a first device, first tunnels in different types of links in which the first device and a second device have established a communication connection;
    establishing, by the first device, a second tunnel that crosses the first tunnels established in the different types of links, wherein the second tunnel and the first tunnels terminate at the second device;
    analyzing, by the first device, a load state of each first tunnel crossed by the second tunnel, and selecting a first tunnel used to transmit a target packet based on the load state analysis;
    encapsulating, by the first device, the target packet into the second tunnel; and
    sending, to the second device through the selected first tunnel, the target packet encapsulated into the second tunnel.

2. The method according to claim 1, wherein sending the target packet comprises encapsulating, by the first device, the target packet into the first tunnel and sending, to the second device through the first tunnel, the target packet encapsulated into the first tunnel.

3. The method according to claim 2, wherein the first tunnel is a tunnel that crosses a virtual link, and the sending comprises encapsulating, by the first device, into the virtual link crossed by the first tunnel, the target packet that is encapsulated into the first tunnel used to transmit the target packet, and sending a packet encapsulated into the virtual link to the second device.

4. The method according to claim 1, wherein a connection between the first device and the second device comprises links established by the first device with the second device by using different interfaces.

5. The method according to claim 1, wherein a connection between the first device and the second device comprises links established by the first device with different interfaces on the second device by using a same interface.

6. The method according to claim 2, wherein a connection between the first device and the second device comprises links established by the first device with the second device by using different interfaces.

7. The method according to claim 2, wherein a connection between the first device and the second device comprises links established by the first device with different interfaces on the second device by using a same interface.

8. The method according to claim 3, wherein a connection between the first device and the second device comprises links established by the first device with the second device by using different interfaces.

9. The method according to claim 3, wherein a connection between the first device and the second device comprises links established by the first device with different interfaces on the second device by using a same interface.

10. A data transmission device, comprising:
    a memory;
    a processor operably coupled to the memory and configured to perform, by invoking an operation instruction stored in the memory, the following:
        separately establish, by a first device, first tunnels in different types of links in which the first device and a second device have established a communication connection;
        establish, by the first device, a second tunnel that crosses the first tunnels established in the different types of links, wherein the second tunnel and the first tunnels terminate at the second device;
        analyze, by the first device, a load state of each first tunnel crossed by the second tunnel, and selecting a first tunnel used to transmit a target packet based on the load state analysis; and
        encapsulate, by the first device, the target packet into the second tunnel; and
    a transmitter operably coupled to the processor and configured to send, to the second device through the selected first tunnel, the target packet encapsulated into the second tunnel.

11. The device according to claim 10, wherein the sending unit is further configured to encapsulate the target packet into the first tunnel and send, to the second device through the first tunnel, the target packet encapsulated into the first tunnel.

12. The device according to claim 11, wherein the first tunnel is a tunnel that crosses a virtual link, and the sending unit encapsulates, into the virtual link crossed by the first tunnel, the target packet that is encapsulated into the first tunnel used to transmit the target packet, and sends a packet encapsulated into the virtual link to the second device.

13. The device according to claim 10, wherein a connection between the data transmission device and the second device comprises links established by the data transmission device with the second device by using different interfaces.

14. The device according to claim 10, wherein a connection between the data transmission device and the second device comprises links established by the data transmission device with different interfaces on the second device by using a same interface.

15. The device according to claim 11, wherein a connection between the data transmission device and the second device comprises links established by the data transmission device with the second device by using different interfaces.

16. The device according to claim 11, wherein a connection between the data transmission device and the second device comprises links established by the data transmission device with different interfaces on the second device by using a same interface.

17. The device according to claim 12, wherein a connection between the data transmission device and the second device comprises links established by the data transmission device with the second device by using different interfaces.

18. The device according to claim 12, wherein a connection between the data transmission device and the second device comprises links established by the data transmission device with different interfaces on the second device by using a same interface.

19. A multilink-based data transmission system, comprising:
    a first device; and
    a second device,
    wherein the first device is configured to:
        separately establish first tunnels in multiple types of links in which the first device and the second device have established a communication connection;

establish a second tunnel that crosses the first tunnels established in the different types of links, wherein the second tunnel and the first tunnels terminate at the second device;

analyze a load state of each first tunnel crossed by the second tunnel;

select a first tunnel used to transmit a target packet based on the load state analysis;

encapsulate the target packet into the second tunnel; and send, to the second device through the first tunnel used to transmit the target packet, the target packet encapsulated into the second tunnel, and wherein the second device is configured to receive, through the first tunnel used to transmit the target packet, a packet sent by the first device and decapsulate the packet so as to obtain the target packet.

20. The system according to claim 19, wherein the first device is further configured to encapsulate the target packet into the first tunnel and send, to the second device through the first tunnel, the target packet encapsulated into the first tunnel.

* * * * *